3,122,451
WIRE INSULATED WITH POLYESTER RESIN FROM BENZENE TRICARBOXYLIC ACIDS AND METHOD OF INSULATING
Wilhelm Bunge and Otto Bayer, Leverkusen, and Karl-Heinz Mielke, Cologne-Stammheim, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Sept. 29, 1958, Ser. No. 763,836
Claims priority, application Germany Oct. 1, 1957
6 Claims. (Cl. 117—232)

This invention relates to coating compositions and, more particularly, to novel coating composition of organic solvent solutions containing polyesters.

It has been known heretofore to use polyesters in the manufacture of coating compositions. The heretofore polyesters used in the manufacture of coating compositions have always been a condensation product of dicarboxylic acids, such as, the aliphatic dicarboxylic acids, for example, adipic acid, and the like, or the aromatic dicarboxylic acids, such as, terephthalic acid, and the like, with polyhydric alcohols, such as ethylene glycol or glycerine, to form polyesters having terminal hydroxyl groups. The heretofore coating compositions based upon these polyesters have not always been entirely satisfactory, for example, these compositions provide coating films which have not always been satisfactory for electrical wires and the like where the wire is subjected to high temperatures. It has also been known heretofore to provide coating compositions which include the above polyesters and a compound which splits off organic polyisocyanate at elevated temperatures, such as, for example, an adduct of an organic polyisocyanate and phenol.

It is an object of the present invention to provide novel coating compositions which, when applied to a suitable substrate, may be cured at elevated temperatures. Another object of the present invention is to provide coating compositions which include compounds which split off organic polyisocyanate at elevated temperatures. It is another object of the present invention to provide coatings having an improved mechanical strength. Still another object of the present invention is to provide coatings resistant to corrosion from chemicals and the like. A still further object of the present invention is to provide coatings which have improved stability at high temperatures. Still another object of the present invention is to provide coatings of improved electrical properties.

The above objects and others are accomplished in accordance with the present invention, generally speaking, by providing coating compositions which contain a polyester obtained by the condensation reaction of any suitable glycol with a benzene-tricarboxylic acid. The term "benzene-tricarboxylic acid" as used herein includes all of the different isomers of benzene-tricarboxylic acid. A particularly suitable benzene-tricarboxylic acid is the 1,2,4 benzene-tricarboxylic acid which is easy to produce and which is characterized by being readily esterifiable and is readily soluble in glycols. Good results are also obtained with polyesters prepared from 1,3,5 benzene-tricarboxylic acid and the tricarboxylic acid which is obtained by oxidation of ethyl-m-xylene (from m-xylene and ethylene using alkylation catalyst).

In order to increase the molecular weight of the polyester it is often desirable to esterify the benzene-tricarboxylic acid in a mixture with terephthalic acid and/or isophthalic acid. Other dicarboxylic acids, such as o-phthalic and adipic acid, can also be added in smaller quantities. These acids are useful in raising the solubility of the polyesters obtained without substantially impairing the film properties of the lacquer film which is produced by their use.

Any suitable glycol may be used for the condensation reaction with the benzene-tricarboxylic acids to provide the polyester of the present invention, such as, for example, ethylene glycol, diethylene glycol, 1,2-propanediol, 2,2-dimethyl-1, 3-propanediol, 4,4'-dihydroxy dicyclohexyl dimethyl methane, bis-hydroxyethylated-4,4'-dihydroxy diphenyl dimethyl methane, butane-diol and hexanediol. The glycols if desired may be esterified as a mixture. In addition to the glycols, polyalcohols of higher valency, such as, for example, glycerine, trimethylol propane, trimethylol ethane, or pentaerythritol, can be used in subordinate amounts in admixture with the glycols for esterification purposes.

The polyesters preferably are produced by slowly heating the polycarboxylic acids to temperatures up to 270° C. together with the polyalcohols in an inert gas atmosphere, such as, for example, nitrogen or carbon dioxide. Mixtures of two or more polycarboxylic acids can be directly subjected to esterification either in admixture or successively. Generally speaking, it is immaterial whether free acids or their low alkyl esters (for example, dimethyl terephthalate) are used. According to other known esterification processes, these reactions are initiated with acid chlorides. The water of condensation can if necessary simply be distilled off in vacuo or may be removed with the aid of an entraining agent. For example, the disturbing sublimation of dimethyl terephthalate may either be suppressed by raising the reaction temperature very slowly or be almost completely prevented by adding xylene, for example, as an inert solvent, to the reaction mixtures, this solvent being readily distilled off as re-esterification progresses.

The speed of the esterification or re-esterification reaction can be increased substantially by the concurrent use of known catalysts, such as, for example, lead oxide, lead acetate, zinc octoate, titanium tetraburylate, or soluble compounds of tin, molybdenum or iron. The catalysts are used in amounts of from about 0.01% to about 0.5%, preferably followed by determining the acid numbers, by establishing the softening points or, even more simply, by determining the viscosity of a solution of the polyester in cresol.

The proportions of the components used for esterification purposes can fluctuate within wide limits, but in every case an excess of alcoholic components will be used in order to obtain a polyester with free hydroxyl groups. The hydroxyl content of the polyester should be between 1.5 and 10% and a hydroxyl content of 2.5 is preferred.

In carrying out the reaction, it may be desirable to start with an amount of glycol components which is substantially in excess of the calculated amount and to remove this excess again during the esterification process by distillation at ordinary temperature or preferably under vacuum.

The alcohols with a valency higher than 2 which can be used, according to the invention, in a subordinate quantity together with the glycols, should not exceed 20 mol percent of the alcholic components.

In a preferred embodiment, the benzene-tricarboxylic acid will preferably be used in admixture with terephthalic acid and/or isophthalic acid. The content of benzene-tricarboxylic acid should be 10–100 mol percent.

The polyesters of the present invention, which almost exclusively form resins which can easily be powdered and are only slightly colored, are used in the form of their solutions in suitable organic solvents as lacquer solutions. Suitable solvents are, for example, the different cresols or xylenols, to which can be added blending agents such as xylenes or polyalkyl benzenes, generally, benzene fractions with a relatively high boiling point, ketones, such as, acetone and cyclohexanone, and esters, such as, ethyl acetate and butyl acetate. The concentration of the lacquer solutions can vary within a very wide limit. Preferably, solutions with a solid content of 10–60% are employed, but the concentration can be raised to the limit of solubility or just below.

The lacquer solutions according to the invention may be applied to the substrates to be lacquered by the processes usual in the lacquer industry, the result being a durable film after the solvent has evaporated. The lacquer solutions according to the present invention are particularly suitable as stoving lacquers. By stoving at temperatures higher than 220° C., lacquer coatings are produced after a short stoving period, the said coatings being characterized by very good covering, very good mechanical strength, high chemical and thermal stability, and, especially, by good electrical properties, so that the lacquer solutions according to the invention are especially suitable for the production of insulation materials subjected to high electrical loads, such as employed in electrical apparatus and motor construction.

The lacquer solutions of this invention can be modified by the addition thereto of a substance splitting off polyisocyanate. As is known, substances splitting off polyisocyanates are compounds which react like polyisocyanates at relatively high temperatures while giving off volatile cleavage products. Among the many known products of this nature, the products to which preference is to be given in connection with the lacquer solutions of the invention are those which allow a very thermostable polyisocyanate to be formed after the thermal cleavage. Examples of substances splitting off polyisocyanate are adducts of an organic polyisocyanate and phenol. Suitable organic polyisocyanates include, for example, p-phenylene diisocyanate, diphenyl methane diisocyanate, 1,5-napthalene, and tolylene diisocyanate.

The quantity of the substances which split off polyisocyanates which may be introduced into the lacquer solutions can fluctuate within wide limits. It is, however, preferred not to use more of such substances than corresponds to a ratio between OH and NCO of 1:1. Such modified lacquer solutions provide stoving lacquers with much improved film properties.

Any suitable pigments, soluble dyestuffs, or flow agents, such as, for example, linear polyamides, can be added to the lacquer solutions of this invention.

The invention is further illustrated without being limited thereto by the following examples, the parts being by weight:

Example 1

About 762 parts by weight of terephthalic acid-bis-glycol ester, about 210 parts by weight of benzene-1,2,4-tricarboxylic acid, and about 1 part by weight of lead oxide are heated in a stirrer-type vessel for about one hour to 200° C., while introducing nitrogen, water being vigorously distilled off. As soon as the release of water subsides, the reaction temperature is raised to 220–225° C. and the reaction mixture is maintained for a further 4 hours at this temperature. 53 parts by weight of distillate are obtained. After another 30 minutes in a vacuum of about 200 mm., the reaction product is poured for cooling purposes on to a dry plate. The spring-hard, slightly yellow resin obtained has an OH content of 5.5% and an acid number of 4.5. Each 100 parts by weight of resin are dissolved in 150 parts by weight of cresol and 35 parts by weight of xylene. Metal sheets are lacquered with this lacquer solution and the sheets are thereafter stoved for about one hour at 230° C. The result is light-coloured temperature-resisting lacquer films which have excellent elasticity and good hardness qualities.

Example 2

About 1270 parts by weight of terephthalic acid-bis-glycol ester, about 420 parts by weight of benzene-1,2,4-tricarboxylic acid, about 50 parts by weight of ethylene glycol and about 1.6 parts by weight of lead oxide are heated in the manner described in Example 1 for about 4 hours at 210° C. and esterification is completed at the same temperature for about 15 minutes in a vacuum of about 50 mm. About 108 parts by weight of water and about 5 parts by weight of ethylene glycol have by then distilled off. The light-colored resin dissolve in cresol to give a clear solution and has an OH content of 4.8% and an acid number of 2.1.

For every 100 parts by weight of solid substance in this lacquer solution are added about 30 parts by weight of a masked polyisocyanate made by reacting about 3 mols of tolylene diisocyanate and 3 mols of phenol with the addition of a small quantity of tertiary amine. The lacquer solution is so adjusted that about 190 parts by weight of cresol and about 50 parts by weight of xylene are present to each 100 parts by weight of polyester and 30 parts by weight of masked polyisocyanate.

When this lacquer solution is applied at about 420° C. to copper wire by means of a continuously operating lacquering machine, it yields wire lacquers with good hardness properties, good resistance to solvents, high scraping strength, and excellent heat resistance. The good electrical properties of the wire lacquer are particularly to be emphasised.

Example 3

From about 420 parts by weight of benzene-1,2,4-tricarboxylic acid, about 1016 parts by weight of terephthalic acid-bis-glycol ester, about 74 parts by weight of ethylene glycol and about 1.2 parts by weight of lead oxide, a spring-hard resin with an OH content of 5.1% and an acid number of 4.4 is prepared as described in Example 1 by esterification at about 220° C. and subsequent vacuum treatment at 350–400 mm.

A lacquer solution suitable for practical purposes is obtained if about 100 parts by weight of this polyester are dissolved in about 150 parts by weight of cresol to which about 35 parts by weight of xylene have been added.

Articles lacquered with this lacquer solution within about 13 minutes after stoving at about 250° C. are coated with a temperature-resistant lacquer film with high plasticity and hardness.

Example 4

About 420 parts by weight of benzene-1,2,4-tricarboxylic acid and about 558 parts by weight of ethylene glycol, and about 1.4 parts by weight of lead oxide are heated to about 200° C. water being split off, until an acid number of about 1 is reached. The mixture is cooled to about 150° C., about 776 parts by weight of dimethyl terephthalate and about 40 parts by volume of xylene are added and the mixture is heated in the course of about another 4 hours to about 240° C., methanol being constantly split off. The xylene previously introduced to prevent the sublimation of the dimethyl terephthalate is in this way distilled off almost quantitatively. After heating for 3 hours at 240° C., a clear transparent spring-hard resin with an OH content of 4% and an acid number of 2.4 is left. 100 parts by weight of this polyester are dissolved in about 150 parts by weight of cresol and about 35 parts by weight of xylene.

Using this lacquer solution, it is possible to lacquer copper wires which, after being stoved at 420° C., are soon provided with coatings which are characterized by excellent electrical properties and good mechanical strength properties.

Example 5

About 630 parts by weight of benzene-1,2,4-tricarboxylic acid are esterified with about 744 parts by weight of ethylene glycol in the presence of about 1.6 parts by weight of lead oxide as described in Example 4, first of all at about 200° C. and then heated to about 245° C. after adding about 970 parts by weight of dimethyl terephthalate. The residue dissolves in cresol to give a clear resin solution, this resin has an acid number of about 2.9 and a hydroxyl content of about 4.2%.

A 40% solution of this resin in a solvent mixture consisting of about 8 parts by weight of cresol and about 2 parts by weight of solvent naptha provides lacquer coatings having very good resistance to heat and chemicals after being applied to the substrate to be lacquered and stoving at 250–270° C.

Although the invention has been described in considerable detail in the foregoing for the purpose of illustration it is to be understood that such detail is solely for this purpose and that variations can be made therein by those skilled in the art without departing from the spirit and scope of the invention except as it is set forth in the claims.

What is claimed is:

1. An electrical conductor having an insulating coating of a polyester resin which is the reaction product of polycarboxylic acid comprising benzene tricarboxylic acid and polyhydric alcohol comprising at least about 80 mol percent of a glycol based on the total mols of polyhydric alcohol.

2. An electrical conductor having an insulating coating of the reaction product of an organic polyisocyanate and a polyester, said polyester being the reaction product of polycarboxylic acid comprising benzene tricarboxylic acid and polyhydric alcohol comprising at least about 80 mol percent of a glycol based on the total mols of polyhydric alcohol.

3. The electrical conductor of claim 1 wherein the polycarboxylic acid comprises terephthalic acid and benzene tricarboxylic acid.

4. The electrical conductor of claim 2 wherein the polycarboxylic acid comprises terephthalic acid and benzene tricarboxylic acid.

5. A method for insulating an electrical conductor which comprises coating the conductor with a polyester which has been prepared by reacting polycarboxylic acid comprising benzene tricarboxylic acid and polyhydric alcohol comprising at least about 80 mol percent of a glycol based on the total mols of polyhydric alcohol.

6. A method for insulating an electrical conductor which comprises coating the conductor with the reaction product of an organic polyisocyanate and a polyester which has been prepared by reacting polycarboxylic acid comprising benzene tricarboxylic acid and polyhydric alcohol comprising at least about 80 mol percent of a glycol based on the total mols of polyhydric alcohol.

References Cited in the file of this patent

UNITED STATES PATENTS

| | | |
|---|---|---|
| 2,562,878 | Blair | Aug. 7, 1951 |
| 2,602,783 | Simon et al. | July 8, 1952 |
| 2,878,201 | Beindorff et al. | Mar. 17, 1959 |
| 2,895,946 | Huffman | July 21, 1959 |
| 2,916,403 | Calderwood | Dec. 8, 1959 |
| 2,929,794 | Simon et al. | Mar. 22, 1960 |
| 2,973,331 | Kraft | Feb. 28, 1961 |